United States Patent [19]

Spencer

[11] 4,406,339
[45] Sep. 27, 1983

[54] OVERSIZED TUB FOR A WALKING DRAGLINE

[75] Inventor: Kieran O. Spencer, Palos Heights, Ill.

[73] Assignee: Olympus Optical Company Limited, Tokyo, Japan

[21] Appl. No.: 298,203

[22] Filed: Aug. 31, 1981

[51] Int. Cl.³ .............................................. B62D 57/02
[52] U.S. Cl. .................................................... 180/8 C
[58] Field of Search .............. 180/8 R, 8 B, 8 C, 8 F, 180/9, 9.28, 9.5, 8.5; 280/87.01

[56] References Cited

U.S. PATENT DOCUMENTS

| 2,179,765 | 11/1939 | Stock | 180/8 D |
| 3,512,597 | 5/1970 | Baron | 180/8 C |

*Primary Examiner*—Joseph F. Peters, Jr.
*Assistant Examiner*—Mitchell J. Hill
*Attorney, Agent, or Firm*—Parkhurst & Oliff

[57] ABSTRACT

A peripheral, radial surface extends outwardly and upwardly from the bottom surface of a circular tub which supports a walking dragline excavator or like machinery. The extension surface reduces bearing pressure on the tub in both stationary and walking positions, and facilitates sliding of the tub relative to underlying terrain as the equipment is moved. The extension surface is angularly disposed relative to the bottom tub surface so as to be substantially parallel to the terrain during walking movement of the dragline. Thus, the dragline load is distributed over a relatively large area, and the bulldozing effect of the tub's trailing edge is minimized.

7 Claims, 3 Drawing Figures

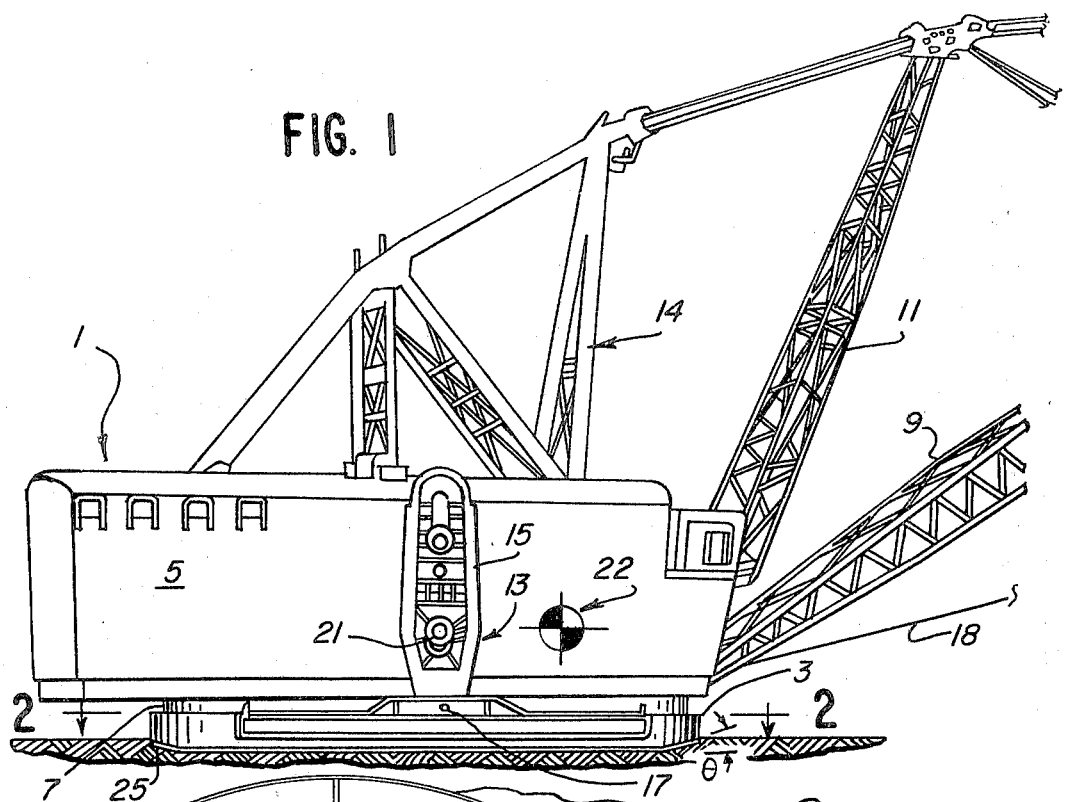
FIG. 1
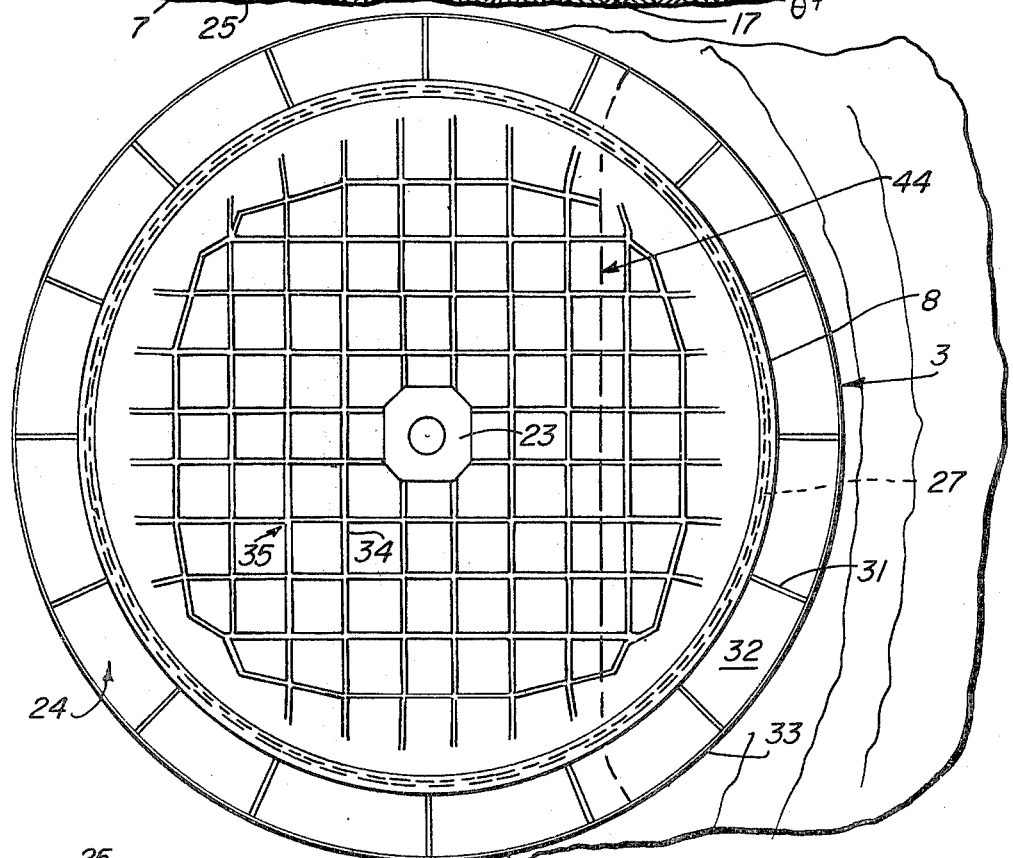
FIG. 2
FIG. 3

OVERSIZED TUB FOR A WALKING DRAGLINE

BACKGROUND OF THE INVENTION

1. Field of the Invention

This invention relates to a supporting foundation for heavy machinery and, more specifically, this invention relates to a tub upon which a walking dragline excavator or the like is supported.

2. Description of the Prior Art

Walking mechanisms for limited relocation of heavy equipment, such as a dragline excavator or like heavy equipment, are well known. When the weight of machinery is excessive, it is impractical to transport the same by apparatus utilizing either wheels or tracks.

Typically the main frame of such machinery is rotatably supported on a circular support tub, which engages the underlying terrain. Extending forwardly of the main frame and supported thereon is a boom which carries an excavating shovel. The excavator is maneuvered by a pair of opposed spuds mounted on the sides of the main frame. A longitudinally extending terrain-engagable shoe is disposed at the lower end of each spud. The spuds are simultaneously raised and translated to effect translational movement of the machinery.

When the frame and tub are elevated by the walking mechanism, the tub, which is carried by a lifting pin attached to the frame, is suspended with its leading edge inclined upwardly from its trailing edge. As the machinery is moved, the tub's trailing edge is drawn along the terrain. Because of the concentration of weight along this edge, the tub must be reinforced to compensate for the resulting stress amplification.

Due to the magnitude of the force exerted by the trailing edge on the terrain, a substantial amount of earth is scraped off as the tub is moved, resulting in the accumulation of a mound of earth beneath the tub. This is undesirable since it results in a concentration of stress on the bottom of the tub which, when the tub is lowered, might exceed the tub's structural capacity.

SUMMARY OF THE INVENTION

According to the invention, the support tub comprises a terrain-engaging base and a peripheral radial extension which extends upwardly and outwardly from the base. The base extension is generally parallel to the terrain over which the tub is drawn when the tub is elevated as the dragline is maneuvered by the walking mechanism.

Thus, the invention provides an enlarged terrain-engaging supporting area for the machinery. With the equipment in a stationary position on soft terrain, the depression of the tub brings the extension into contact with the terrain and therein reduces the unit bearing pressure applied to the bottom of the tub as well as enhancing the tub's stability. On firm ground, where added stability is not required, the extension does not engage or only partially engages the terrain.

Further, the machinery's performance during walking is improved. When walking on soft ground, the terrain-engaging region of the tub includes both the trailing segment of the extension and a portion of the flat tub bottom. This decreases the unit pressure applied by the tub to the ground, and consequently allows the tub to skim the terrain surface, rather than bulldozing the terrain in its path. Thus, the resistance to movement is decreased as is the buildup of earth beneath the tub. The bending moment applied to the tub during walking on soft surfaces is also reduced. Thus, because the bending stresses are reduced, the stress conditions experienced in the tub approximate those of a smaller tub, and the amount of material required to reinforce the tub is significantly reduced.

Further, the stresses on the tub resulting from the weight of the machinery are concentrated about a circular rail girder on the tub, as opposed to the main body of the tub when the tub is positioned for walking on firm terrain. With prior tubs, stresses induced by the weight of the machinery are concentrated on the tub's trailing edge and are thus distributed radially inwardly of the rail girder, necessitating extensive reinforcement to accommodate the dispersed stresses.

Further objects and advantages of the invention will be apparent to those skilled in the art from the following detailed description, taken in conjunction with the drawings and the appended claims.

BRIEF DESCRIPTION OF THE DRAWINGS

FIG. 1 is a side elevation of a walking dragline excavator incorporating the oversized support tub of the invention;

FIG. 2 is an overhead sectional view of the tub taken generally along line 2—2 of FIG. 1 illustrating the region of contact between the tub and the underlying terrain when the excavator is elevated by the walking mechanism; and FIG. 3 is a side elevation of the tub relative to the terrain when the tub is positioned as in FIG. 2.

DESCRIPTION OF THE PREFERRED EMBODIMENT

Referring to FIGS. 1 and 2, a dragline excavator 1 incorporates a support tub 3, described in detail below. A gantry 5 is rotatably mounted on the tub 3. Turntable operation is accomplished by a roller assembly 7 comprising upper and lower circular rails 8 on the gantry 5 and tub 3, respectively, and a series of guiding rollers (not shown) between the rails 8.

Extending forwardly of the gantry 5 and pivotally attached thereto are an extendable boom 9 and a fixed support boom 11. A fixed supporting mast structure 14 extends upwardly from the gantry 5 and serves as a rigid support through which lift lines 16 are extended. The lines 16, in conjunction with a drag line 18 extending forwardly from the gantry, control extension of the boom 9 and a bucket (not shown), which is suspended from the forward edge of the boom 9. The digging and hauling operations performed by the dragline bucket, and the particular machinery which accomplishes the same, are well known in the art.

The excavator 1, which may typically exceed 500 tons in weight, is maneuvered by a walking mechanism 13, which is known in the art. The walking mechanism 13 of FIG. 1 comprises a pair of opposed spuds 15 extending from each side of the gantry 5. Each spud 15 is pivotally connected at 17 to an elongated walking shoe 19. The spuds 15 are operated simultaneously by rotation of crank pins 21 and effect translational movement of the excavator 1.

Walking movement is effected by first lowering the suspended bucket (not shown) to the ground, thereby decreasing the effective weight of the excavator 1. The bucket is thereafter dragged with the excavator as it is moved.

The walking mechanism 13 is designed to effect a 6-7 foot movement with each step. A single step is completed upon rotation of the crank pin 21 through a 180° cycle in a counterclockwise direction as seen in FIG. 1. As the pin 21 is rotated, a pure lifting motion is first accomplished. Because the walking mechanism 13 is situated rearwardly of the center of gravity 22 of the excavator 1, this lifting force causes the rear of the excavator (toward the left in FIG. 1) to be elevated relative to the front, thereby suspending the tub 3 in an angular position relative to the terrain. The tub 3 is secured to the gantry by means of a lifting pin 23 which is most clearly illustrated in FIG. 2. At this stage, the trailing edge of the tub 3 is in contact with the terrain and serves to balance the suspended excavator.

Further rotation of the crank pin effects rearward translational movement of the excavator 1, toward the left in FIG. 1. As this is done, the bucket and the supporting trailing edge of the tub are drawn over the terrain. Continued rotation of the crank pin results in reseating of the tub 3 on the terrain and lifting and translation of the shoes 19 to their original position in contact with the terrain.

A cross-sectional view of the structure of the tub 3 is shown in FIG. 2. The tub 3 is preferably circular in cross-section. A tub 3 having an approximate diameter of 61 feet exclusive of extension, includes a radial extension 24 of about 7 feet. The dimensions depend on the total weight of the excavator 1. The depth of the tub 3 is generally uniform. For example, the tub depth in FIG. 3 is approximately 42 inches, again depending on the weight of the excavator 1 and the tub diameter. The circular bottom surface of the tub 3, which is designed to be seated on flat terrain, preferably comprises a continuous metal sheet 25 (FIG. 3). An inner rail girder 27 extends upwardly from the periphery of sheet 25 to support the rail.

Extending outwardly from the periphery of sheet 25, and preferably circumferentially therefrom, is the radial extension 24. A series of radially extending plates 31 reinforce the extension in the region between the inner rail girder 27 and an outer girder 33 which defines the outer edge of the tub. A flat plate 32 covers the annular region above the plates 31.

Referring again to FIG. 2, a webbed network 35 extends throughout a major portion of the tub 3. The network includes a flange 34 situated over its top edge to which the corresponding segments of the top plate are secured.

The divergent angle $\theta$ of the bottom surface of extension 24 with respect to the sheet 25 is illustrated in FIG. 3. The center line 39 of the vertically positioned spud is positioned rearwardly (to the left) of the tub's center line 40. The angle at which the tub's bottom surface is situated relative the ground during walking is indicated by the angle $\alpha$. The divergent angle $\theta$ of the extension is chosen so that the rise of the tub during the walking maneuver will place substantially all of the surface of the extension segment flush to the ground. An extension that rises $\frac{1}{2}$ inch per foot over the 7 foot extension will be parallel when the rear edge of the tub is elevated $30\frac{1}{2}$ inches. Thus, the desired divergent angle $\theta$ will depend on the particular angle at which the tub is to be suspended during walking movement. Generally, the two angles are approximately equal.

The portion of the tub's bottom surface 25 which contacts relatively soft terrain during walking, when the tub's surface 25 is inclined at an angle of about 3°, is indicated in FIG. 2 by the dotted line 44. The load of the excavators is distributed over significantly more of the tub region as indicated in the drawing by the region enclosed by the dotted lines. The structure suitable to accommodate the reduced stresses resulting from the load distribution requires less material and consequently weighs less and is less expensive to construct, as compared to prior tubs.

FIG. 1 shows the excavator in a stationary position on a relatively soft surface. The excavator's depression of about $3\frac{1}{2}$ inches into the terrain brings an additional area of about 1495 square feet of support tub into contact with the ground by reason of the additional area of the extension. On soft ground, this additional area is necessary to keep the equipment from sinking unmanageably within the supporting terrain. On a harder surface, where the depression is minimal, the extension remains elevated above the ground, and does not support the machinery.

During the walking maneuver, approximately $\frac{2}{3}$ of the weight of the machinery is carried by the walking shoes. Consequently, about $\frac{1}{3}$ of the weight of the machinery may be concentrated on the tub extension. Besides distributing the resultant forces over the tub bottom surface as previously discussed, the extension also serves to relocate the concentrated stresses, particularly on relatively hard surfaces. In prior tubs, the force exerted on the trailing edge of the tub resulted in a substantial bending moment over a large section of the trailing edge. In the tub 3 of the figures, however, the extension concentrates the largest bending moment about the reinforced region of the rail girder. The structure may thus be reinforced specifically thereabout as opposed to reinforcement of a larger area of the tub. Again, the amount of material required, and thus the weight and cost of construction, are minimized.

Besides the structural considerations associated with the load distribution, the present invention facilitates sliding of the tub over terrain during walking. By avoiding a concentration of weight on the underlying terrain, the trailing edge is kept from gouging or "bulldozing" the surface as it travels. This minimizes the buildup of soil beneath the tub which causes stress concentration as the tub is lowered. Such buildup also creates an uneven foundation for the tub when it is ultimately seated.

The foregoing detailed description is made for purposes of illustration and no unnecessary limitations are to be understood therefrom, as modifications within the scope of the invention will be obvious to those skilled in the art.

I claim:

1. In a walking dragline machine comprising a main body, opposed terrain-engageable walking means for lifting and translation of said body across a terrain, a tub underlying, supporting, and being movable with said main body including a flat terrain-engaging bottom surface, and means for inclining said tub at a preselected angle to the terrain in effecting walking of the machine across the terrain, the improvement wherein said tub includes a peripheral radial extension having a surface extending angularly upwardly from said bottom tub surface, the angle defined between said extension surface and said bottom tub surface being substantially equal to said preselected angle whereby said extension surface facially engages the underlying terrain as the tub is translated by said walking mechanism.

2. The improvement of claim 1 wherein said bottom tub surface is substantially circular and said extension surface is extends circumferentially outwardly therefrom.

3. In combination:

a main body;

opposed terrain-engageable walking means extending from opposite sides of said main body;

a terrain-engageable tub underlying and supporting the main body, said tub comprising a substantially flat terrain-engaging bottom surface and a peripheral radial extension having a frustoconical surface extending angularly upwardly from the periphery of said tub bottom surface; and means for inclining said tub at a preselected angle to the terrain in effecting walking of the machine across the terrain, the angle defined between said peripheral radial extension and said tub bottom surface being substantially equal to said preselected angle whereby the trailing portion of the extension surface substantially facially engages the underlying terrain as the tub is translated by said walking mechanism.

4. The combination of claim 3 wherein said flat terrain-engaging bottom surface is substantially circular and said extension surface extends circumferentially about said bottom surface.

5. In a walking dragline machine comprising a main body, opposed terrain-engageable walking means for situating said body at a predetermined angle with a supporting terrain and translating said body across the terrain, and a tub underlying, supporting, and being movable with said main body including a flat terrain-engaging bottom surface, the improvement wherein said tub has a rear portion extending angularly upwardly from said bottom tub surface, the angle defined between said rear portion and said bottom tub surface being approximately equal to said predetermined angle, said rear portion of the tub substantially facially engaging the underlying terrain as the tub is translated by said walking mechanism.

6. The improvement of claim 5 wherein said bottom tub surface is substantially circular and said peripheral portion extends circumferentially outwardly therefrom.

7. In a walking dragline machine comprising a main body, opposed terrain-engageable walking means for lifting and translation of said body across a terrain, a tub underlying, supporting, and being movable with said main body including a flat terrain-engaging bottom surface, and means for inclining said tub at a preselected angle to the terrain in effecting walking of the machine across the terrain, the improvement wherein said tub includes a peripheral radial extension having a surface extending angularly upwardly from said bottom tub surface, the angle defined between said extension surface and said bottom tub surface being substantially equal to said preselected angle whereby said extension surface facially engages the underlying terrain as the tub is translated by said walking mechanism, said preselected angle being approximately 3°.

* * * * *

UNITED STATES PATENT AND TRADEMARK OFFICE
CERTIFICATE OF CORRECTION

PATENT NO. : 4,406,339

DATED : September 27, 1983

INVENTOR(S) : Kieran O. Spencer

It is certified that error appears in the above-identified patent and that said Letters Patent is hereby corrected as shown below:

On the title page:
Please change assignee from:

Olympus Optical Company Limited
    Tokyo, Japan to:

Page Engineering Company
    Chicago, IL

Please change attorney, agent or firm from:

Parkhurst & Oliff to:

Wood, Dalton, Phillips, Mason & Rowe

Signed and Sealed this

Tenth Day of January 1984

[SEAL]

Attest:

GERALD J. MOSSINGHOFF

*Attesting Officer*     *Commissioner of Patents and Trademarks*